(12) United States Patent
Chau

(10) Patent No.: US 6,757,411 B2
(45) Date of Patent: Jun. 29, 2004

(54) METHOD AND SYSTEM FOR FINGERPRINT ENCODING AND AUTHENTICATION

(75) Inventor: Lam Ko Chau, Ottawa (CA)

(73) Assignee: Liska Biometry Inc., Candia, NH (US)

(*) Notice: Subject to any disclaimer, the term of this patent is extended or adjusted under 35 U.S.C. 154(b) by 488 days.

(21) Appl. No.: 09/965,809

(22) Filed: Oct. 1, 2001

(65) Prior Publication Data

US 2003/0035569 A1 Feb. 20, 2003

Related U.S. Application Data

(60) Provisional application No. 60/312,371, filed on Aug. 16, 2001.

(51) Int. Cl.[7] .................................................. G06K 9/00
(52) U.S. Cl. ........................ 382/125; 382/204; 340/5.83
(58) Field of Search ................................. 382/115, 124, 382/125, 190, 181, 288, 286, 204, 203; 340/5.52, 5.53, 5.82, 5.83; 250/221; 345/157; 356/71

(56) References Cited

U.S. PATENT DOCUMENTS

| | | | |
|---|---|---|---|
| 3,527,535 A | 9/1970 | Monroe | |
| 3,558,864 A | 1/1971 | French | |
| 4,817,183 A | 3/1989 | Sparrow | |
| 5,233,404 A | 8/1993 | Lougheed et al. | |
| 5,416,573 A | 5/1995 | Sartor, Jr. | |
| 5,801,681 A | 9/1998 | Sayag | |
| 6,166,370 A | 12/2000 | Sayag | |
| 2002/0071598 A1 * | 6/2002 | Kunieda et al. | 382/125 |

FOREIGN PATENT DOCUMENTS

| | | |
|---|---|---|
| EP | 0 372 762 A2 | 6/1990 |
| WO | WO 01/06447 A1 | 1/2001 |
| WO | WO 01/26549 A1 | 4/2001 |

OTHER PUBLICATIONS

A 10 MB/S Data Storage System Using a Commercial Video Tape Recorder; William M. Loh; Apr. 1980; Department of Electrical Engineering University of Toronto.

Friction Ridge Indentification based on Pore Structure—A case Study; Constable Frank Barclay, Thunder Bay Police Force, Canada; Jan. 1997; pp 7 to 13.

Identification Note; Poroscopy; Cpl. D.R. Ashbaugh, The Pas RCMP Indent. Section,The Pas, Manitoba; vol. 45 No. 2, 1983; R.C.M.P. Gazette; pp 12 to 17.

Identiication Note; Fingerprint Identification Today; Cpl. D.R. Ashbaugh, NCO i/c The Pas RCMP Ident. Section, The Pas, Manitoba; vol. 45, No. 12, 1983; R.C.M.P. Gazette; pp 19 to 22.

Identification Note; Edgeology; Cpl. D.R. Ashbaugh, NCO i/c Identification Section, The Pas, RCMP Detachment, The Pas, Manitoba; vol. 44, No. 2, 1982; R.C.M.P. Gazette; pp 4 to 6.

(List continued on next page.)

*Primary Examiner*—Timothy M. Johnson
*Assistant Examiner*—Ali Bayat

(57) ABSTRACT

A method, system and computer readable-storage medium for generating an identification code from a fingerprint image exhibiting a plurality of features. The method includes establishing a reference point from the plurality of features, generating at least one metric from the reference point and at least one of the plurality of features and forming the identification code from the at least one metric. Changes in the temperature and humidity of a finger when the image is taken at different times will result in minor variations of the measured features which, upon quantization, result a metric that is invariant from one fingerprint image to the next, for the same finger. This lowers the false rejection rate to an acceptable level. Meanwhile, the metric is sufficiently unique for a given set of features such that the probability of assigning the same metric to two different fingers is lowered to an acceptable level.

44 Claims, 15 Drawing Sheets

OTHER PUBLICATIONS

Identification Note; Ridgeology: Our Next Evaluative Step; Cpl. D.R. Ashbaugh, NCO i/c The Pas RCMP Indent. Section, The Pas, Manitoba; vol. 45, No. 3, 1983; R.C.M.P. Gazette; pp 10 to 14.

Establishing Identity by Microscopic Ridge Detail; Poroscopy; Fingerprint Techniques; 1971; Philadelphia; Chilton Book Company; ISBN 0-8019-5527-0; pp 281 to 285.

The Collected Papers of Hassler Whitney; Non-Separable and Planar Graphs; 1992; edited by James Eells and Domingo Toledo, Birkhauser; Boston; pp 37 to 41.

The Edge of Randomness; 1999; Springer-Verlag New York, pp 130 and 131.

Christopher Champod and Pierre A. Margot; Computer Assisted Analysis of Minutiae Occurrences on Fingerprints; Proceedings of the International Symposium on Fingerprints Detection and Indentification, Israel National Police, 1996, pp 305-318.

Invitation to Pay Additional Fees (PCT Article 17(3)(a) and Rule 40.1), in respect of corresponding International application No. PCT/CA 02/01274, Dec. 9, 2002.

A Fingerprint Verification System Based on Triangular Matching and Dynamic Time Warping; Zsolt Miklos Kovacs-Vajna; IEEE Transactions on Pattern Analysis and Machine Intelligence, vol. 22, No. 11, Nov. 2000.

* cited by examiner

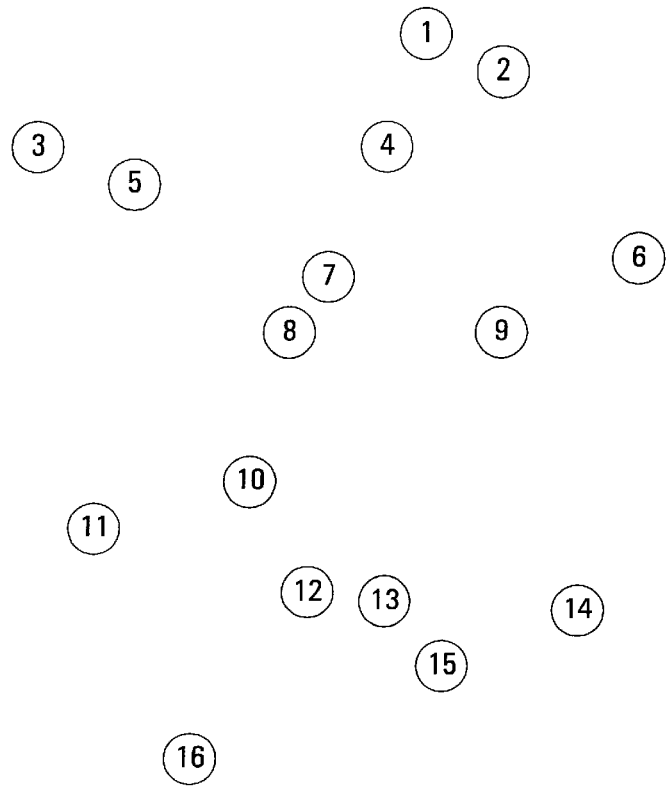
FIG. 3A
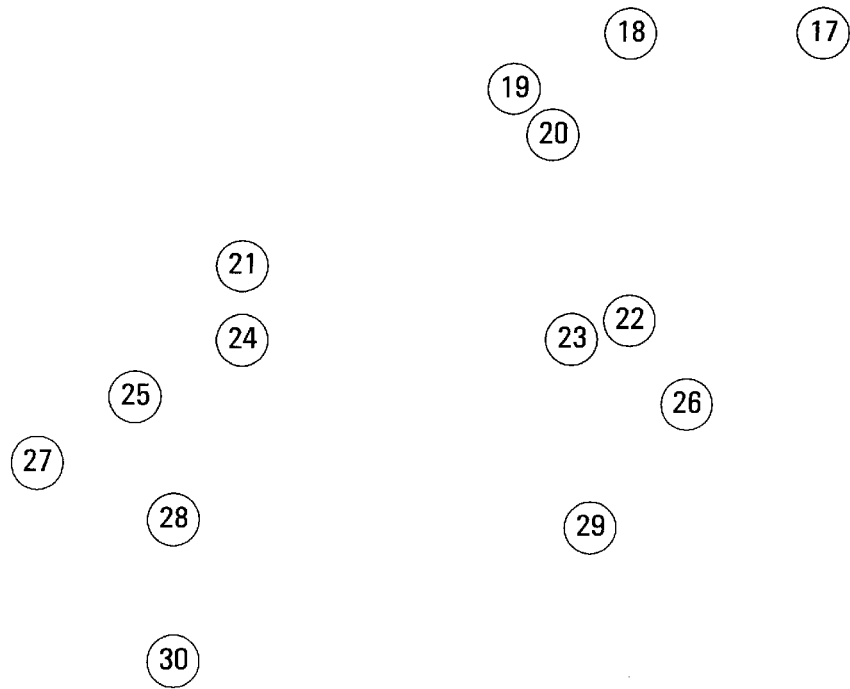

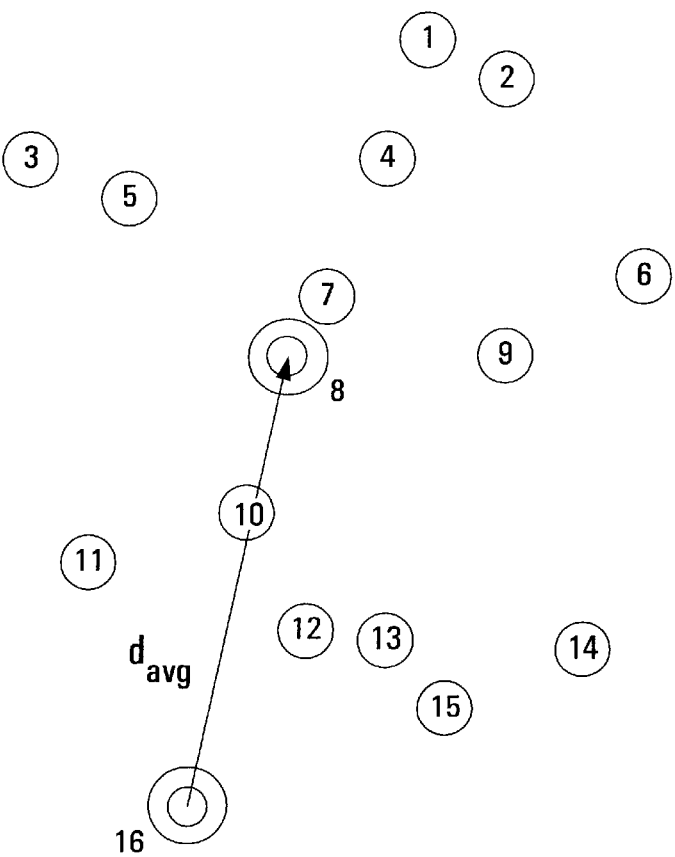
FIG. 5A
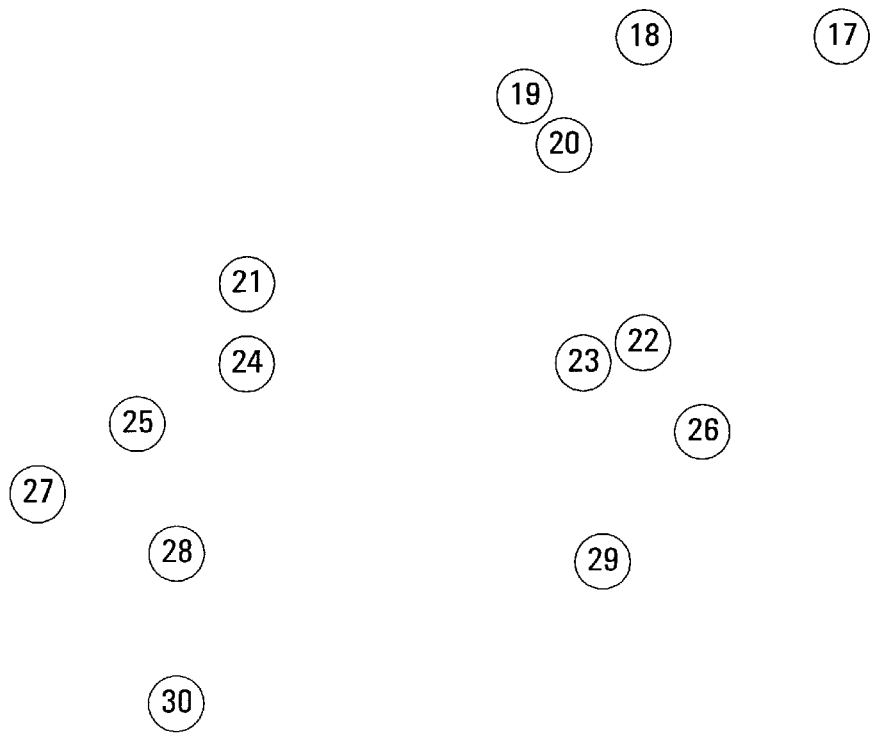

METHOD AND SYSTEM FOR FINGERPRINT ENCODING AND AUTHENTICATION

CROSS-REFERENCES TO RELATED APPLICATIONS

This application claims the benefit of U.S. Provisional Patent Application Serial No. 60/312,371 to Lam Ko Chau, filed on Aug. 16, 2001 and hereby incorporated by reference herein.

FIELD OF THE INVENTION

The present invention relates to fingerprint authentication and, more specifically, to a method and system for mapping a fingerprint image into a code such that the code resulting from fingerprint images taken from a same donor finger under varying environmental conditions exhibits invariance.

BACKGROUND OF THE INVENTION

In order for fingerprint recognition to gain widespread acceptance as a reliable live-scan authentication tool, two major hurdles need to be overcome. The first involves obtaining a clear fingerprint image from a finger that may exhibit a variety of skin properties and the second involves obtaining high authentication accuracy based on fingerprint images.

Optical live-scan fingerprint scanners normally employ the mechanism of total internal reflection in a dark field, where the angle of observation from a camera is set at a so-called "glass/air critical angle". In a two-dimensional picture, a transparent glass or plastic prism can be represented by an inverted, truncated triangle with the longer of two parallel surfaces being the platen used for making impressions of a live finger. Light illumination can come though the cut-off apex from below (i.e., the shorter parallel surface) or, alternatively, through one of the two nonparallel faces, with the camera pointing at the other nonparallel face.

Optical configurations such as the one described herein above are more rugged and produce images with higher resolution than most non-optical sensing methods such as capacitive, electric field and contact sensing. However, problems associated with so-called "keystone distortion" and problems due to fingertips with dry skin have been identified as obstacles for its usefulness as a biometric device.

Keystone distortion can be minimized by the theory of tilted planes, in combination with a software equalizer algorithm performed on an expanded image bit map to trade image size for linearity. An optical solution is to incorporate geometric equalization to compensate for the differences in distance travelled by light rays, by introducing a complementary prism between the platen prism and the camera.

The so-called "dry finger" problem is a more serious issue. In order to understand this problem, one can begin by examining what makes a print. Looking from a plan view, the skin surface of a fingertip consists of a number of curved ridges forming arches, loops and whorls, as well as composite and accidental flow patterns. Viewed in elevation under magnification, a segment of a length of ridge structure is made up of minute elevations (papillae) of uneven heights lining up in a row. This is why an inked impression of fingerprint shows broken lines and is subject to smudging and smearing of ink.

Pores exist only on ridges, and they are the opening of sweat glands under the epidermis. People who do not have dry skin problems usually have a deposit of sweat beads sitting on top of the pores. These liquid beads of sweat play a very critical role in latent print detection and render optical impression feasible. However, people with dry skin do not have as many sweat beads, which makes image taking difficult. The reason for this is now explained.

An image shows because there is intensity contrast amongst information-carrying pixels in the incident photons. If one considers the geometry of the prism as an inverted triangle, one can set up a dark field for observation purposes when the optical axis of the camera looking upwards from one side is aligned at the glass/air critical angle. Proper light illumination from underneath the prism will traverse through the transparent material of the prism and exit therethrough. Most of the ambient light surrounding the platen surface cannot reach the camera because reverse geometry of Snell's law dictates that most of the photon energy entering the body of the prism from above will be confined to below the glass/air critical angle. Dark field photography can thus be made sensitive under a noisy environment.

U.S. Pat. No. 3,527,535 to John N. Monroe, uses the term "diffusely reflected light" to describe the mechanism whereby the points where the ridges touch will appear white (light) and the background and spaces between ridges will appear black (no light). This refers to a live-scan process in which a finger touches the prism platen to form an interface for optical fingerprint impression taking.

U.S. Pat. No. 5,233,404, issued on Aug. 3, 1993 to James H. Lougheed and Lam Ko Chau, suggested an improved mechanism for contrast enhancement to Monroe's dark field principle. The term "dispersed light" is used in their patent to account for the manifestation of ridges in contact with the prism platen as bright images observed at above the critical angle.

The term "absorbed/dispersed light" is also employed in U.S. Pat. No. 5,416,573, issued on May 16, 1995 to Thomas F. Sartor, Jr., to describe internally reflected light where the finger ridges contact the prism surface. This patent discloses making the observation angle of the detector sufficiently large so that the fingerprint image will be free of artifacts attributable to moisture.

However, U.S. Pat. No. 5,416,573 does not explain why such a diffusion or dispersion phenomenon is not observed by the detector at the same observation angle when a flat object is in contact with the prism platen. For example, if the angle of reflectance described in U.S. Pat. No. 5,416,573 has a range large enough to cover the angle of observation, then a two-dimensional image of a three-dimensional object having a flat surface at contact should appear in the dark field. However, this is not the case, as long as the object/platen boundary region is completely flat and air-tight. Further explanation becomes necessary when a clear and legible fingerprint ridge pattern of a reproducible nature is desired, which is the case when live authentication is being considered.

If one carves out a grid pattern on the flat surface of a solid object and places this carved flat surface in contact with the platen of a dark field scanner, the air-filled grid pattern would appear dark and the solid contact regions bright. For good contrast, it is necessary that rows and columns of air trapped in cavities be tight. What seems to happen to the camera mounted above the critical angle is the formation of contrast due to the following mechanism. Take the case where source light beam enters one of the two non-parallel surfaces of a glass prism. If the object is totally flat and devoid of air pockets, some light will be reflected and enter the camera aperture. The important phenomenon is that the reflected beam of light is homogeneous and uniform, as the solid/glass boundary layer is homogeneous and uniform. Therefore, no contrast is noticeable. With air pockets trapped in the flat object surface, the solid wall forming the air volume bounced the photon energy back in all directions, including a horizontal direction parallel to the platen surface. At this air/glass boundary layer, the reflected horizontal light enters the glass medium from an air medium, and will be confined after refraction through the optical path within the glass prism to an angle equal to or below the critical angle according to Snell's law of total internal reflection in reverse. Consequently, less photon energy from the air/glass layer will enter the camera than that from the solid/glass layer due to differences in reflector geometry. It becomes clear that the degree of darkness in the dark image field is only relative, and it is the contrast ratio that will largely define the picture quality.

Live-scan devices make use of the difference in heights between a ridge and a valley of the fingertip skin surface. A ridge is typically tens of microns (one millionth of a meter) higher than a valley on a free standing up-turned finger. Upon turning the fingertip 180 degrees and being pressed against a platen, the difference in heights is reduced somewhat depending on the amount of applied pressure, but is still ten or more times larger than the thickness of layer of sweat which is typically a few microns. Papillary ridges originate from the minute elevations (papillae) of the epidermis, and are of uneven heights when viewed under a microscope. In absence of sweat moisture, some of the shorter ridges will fail to trap air pockets and become indistinguishable with valleys and are therefore "missed". This faint impression phenomenon is equivalent to the under-inked situation and is usually attributed to the "dry finger" problem. Because air/glass boundary layers are ill defined in a hard, dry finger, the contrast ratio is poor compared with a soft, moist finger.

Since sweat pores run in single rows along the ridges only, and human sweat is made of water and lipid having a higher refractive index than air, a non-dry fingertip in contact with a platen has two refractive media instead of just air, namely, both liquid and air. It is a very fortunate fact that valleys do not contain sweat pores so that they can be separated from ridges through refractive discrimination. For the glass/liquid/air configuration of live-scan imaging, the liquid/glass boundary layer serves to raise the critical angle above that of the air/glass angle resulting in more photon energy incident to the camera aperture. When the level of liquid is high enough to touch the shorter ridges, but not high enough to fill up the air cavities of the valleys, the amounts of photons entering the dark fields is largest from the tall ridges, medium from the short ridges, and smallest from the partially air-filled valleys, respectively. However, all three objects are distinct in the dark image plane representing an optimum condition of operation. When the level of liquid fills up the air cavities, the overall liquid/glass boundary layer becomes homogeneous and uniform, resulting in an over-inked equivalent situation where the three objects become indistinct and result in total contrast destruction. This information deletion is worse than the under-inked condition, and is the subject of U.S. Pat. No. 5,416,573.

The remedy for dry fingers is to apply a thin layer of liquid externally between the object and the glass platen. It is possible to select a liquid with special optical properties so that an optimized contrast ratio between ridges and valleys can be achieved by chemical, optical and photon-sensing means. The above description demonstrates the importance of the thickness of liquid, almost analogous to the ink impression taking process. Once this remedy is implemented, and it is well known that the ridge pattern stays stable when applied pressure exceeds a certain limit, a clear and legible fingerprint can be captured, which should be reproducible, thereby rendering live fingerprint authentication technology feasible.

Assuming that a satisfactory image can be taken using one of the above-described (or other) methods, the second problem, i.e., that of reaching a high authentication accuracy, must be solved before live-scan fingerprint authentication can be considered a reliable tool in the fields of law enforcement, resource protection, electronic or non-electronic commerce, etc.

Two factors that limit the capability of live-scan devices to achieve high authentication accuracy are the rate of false acceptance and the rate of false rejection. The false acceptance rate is the frequency with which a device would accept the fingerprint of a donor during a matching operation between a query print from the donor and a different donor's pre-stored template. The false rejection rate is the frequency with which a device would reject the fingerprint of a donor during a matching operation between a query print from the donor and the donor's own pre-stored template. Solving the problem of achieving a high authentication accuracy therefore reduces to keeping the rates of false acceptance and false rejection to within acceptable upper bounds.

A general approach to reducing the false acceptance rate is to seek out features that are unique amongst fingerprint images from different donors. Much research has been done in this area over the last century, with computerized matching techniques having been introduced more recently. However, despite enormous investments by governments and corporations, fingerprint authentication has still not become the choice identification technology for most high-reliability applications. A reason for this is that many of the authentication methods that are capable of lowering the false acceptance rate actually suffer from a high false rejection rate. In other words, existing fingerprint authentication methods are often incapable of recognizing that certain features, which appear to be different between a query image and a pre-stored template, may in fact originate from the same finger.

A general approach to reducing the false rejection rate is to seek out features of a fingerprint image that do not vary when images are taken from the same donor finger. However, this requirement is difficult to satisfy, as a given donor's finger will likely have a different orientation, humidity, temperature and/or pressure at the time when a query print is taken, compared to the time at which the pre-stored template was taken. Moreover, there is an added difficulty of ensuring that improvements in terms of lowering the false rejection rate do not cause the false acceptance rate to increase beyond an acceptable level.

Currently, there are no approaches to live-scan fingerprint authentication that can provide both a false acceptance rate and a false rejection rate that are sufficiently low for the technique to be used in high-reliability or high-security applications.

SUMMARY OF THE INVENTION

The present invention recognizes that a frame of reference for a fingerprint image can be defined on the basis of the features of the fingerprint image itself, which eliminates the requirement for defining an orientation with respect to an external reference frame such as the platen on which the finger is placed. Moreover, the present invention recognizes that even though the temperature and humidity of a finger may be different when the image is taken at different times, certain features of the fingerprint image, when measured with respect to the frame of reference, will exhibit merely minor variations. Upon quantization, there results a metric that is invariant from one fingerprint image to the next, for the same finger, thereby reducing the potential of a false rejection.

Moreover, robustness of the metric carries through, even when the metric is formed of a plurality of sub-metrics defined for respective sectors of the fingerprint image. It has been found that when the number of sectors is sufficiently large, yielding a corresponding number of sub-metrics assembled together in forming the metric, the probability of assigning the same metric to two different fingers can be reduced to an acceptable level. This permits a reduction in the false acceptance rate, in conjunction with the above mentioned reduction in the false rejection rate.

The invention may therefore be summarized according to a first broad aspect as a method, system and/or computer readable-storage medium for generating an identification code from a fingerprint image exhibiting a plurality of features. The method includes establishing a reference point from the plurality of features, generating at least one metric from the reference point and at least one of the plurality of features and forming the identification code from the at least one metric.

According to a second broad aspect, the invention may be summarized as a method and/or system for generating an identification code for association with a human finger. The method includes obtaining a fingerprint image of the finger, identifying a plurality of features on the fingerprint image, establishing a reference point from the plurality of features, generating at least one metric from the reference point and at least one of the plurality of features, and forming the identification code from the at least one metric.

The invention may also be summarized according to a third broad aspect as a method and/or system for generating an identification code for association with a human finger. The method includes obtaining a plurality of fingerprint images of the finger, identifying, for each fingerprint image, a respective plurality of features, establishing, from each plurality of features, a respective reference point, generating, from each plurality of features and the respective reference point, a respective metric, identifying a most frequently occurring metric from amongst the generated metrics, and forming the identification code as a function of the most frequently occurring metric.

The invention may be summarized according to a further broad aspect as a signal embodied in a transmission medium, comprising a code associated with a human finger, the code including at least one quantized metric generated as a function of (i) at least one of a plurality of features and (ii) a reference point established from the plurality of features.

According to yet another broad aspect, the invention may be summarized as a fingerprint-based user authentication system. The system includes a database of identification codes uniquely associated with respective users, an input device for obtaining, from a test user, a first fingerprint image and information identifying a first user and a controller connected to the input device and to the database. The controller is operable to access the database in order to obtain a first identification code associated with the first user, process the first fingerprint image in order to generate a second identification code and authenticate the test user as the first user by comparing the first and second identification codes to one another.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the drawings:

FIG. 3A shows a graph of vertices created from the fingerprint image of FIG. 1A;

FIG. 5A shows definition of a metric based on the graph of vertices of FIG. 3A and on the reference point established in FIG. 4A;

DETAILED DESCRIPTION OF THE PREFERRED EMBODIMENTS

Two distinct features are described herein below. The first involves techniques used in the generation of a donor-invariant code, while the second involves practical ways in which a database of such codes can be created and used to authenticate human beings. It is assumed that the fingerprint images being dealt with are sufficiently clear, as can be obtained using, for example, one of the techniques described previously in the section entitled "Background of the Invention".

Figure 2:
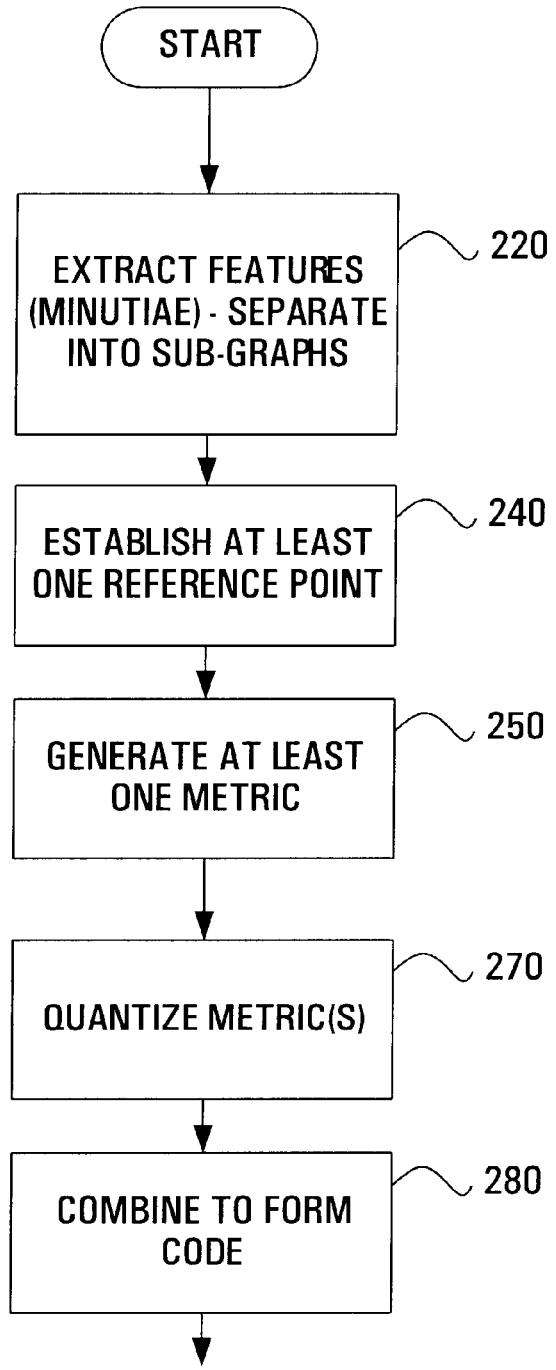
FIG. 2 is a flowchart illustrating the operational steps of an algorithm for mapping a fingerprint image into code, in accordance with an embodiment of the present invention.

FIG. 2 shows the operational steps in an algorithm which takes a fingerprint image and transforms it into a code that is the same for a range of environmental conditions, such as temperature, finger pressure, humidity, orientation with respect to a platen, etc. Invariance of the transformation to such conditions reduces the false rejection rate. Meanwhile, although it is invariant to a wide range of conditions that characterize a same donor finger, the resultant code is sufficiently unique to each different donor finger such that a test finger will almost never match an incorrect donor finger, this being indicative of a very low false acceptance rate.

At step 220 of the algorithm of FIG. 2, a series of features is extracted from the fingerprint image using imaging processing software. An example of a feature that can be extracted from a fingerprint image is a vertex, which may be defined as an intersection of two edges. Those skilled in the art will appreciate that it is a straightforward task to design image processing software that recognizes vertices on a fingerprint image. It is noted that feature extraction need not require the identification of all vertices on the image. Also, it is noted that a subset of the vertices may correspond to what are known as "minutiae", which have typically been the focus of feature extraction in conventional matching techniques.

Of course, the higher the quality of the initial fingerprint image, the more reliable the extraction of features (e.g., vertices, minutiae, etc.) therefrom. By attaching a point in space to each of the extracted features, a graph of points is created. For the example, in the case of the fingerprint image of FIG. 1A, extraction of vertices results in the identification of points 1–30 seen in FIG. 3A. Some of the vertices will be "isolated" and others will be "non-isolated"; the distinction will be explained later on in greater detail. In other examples, features other than vertices (for example, singularities) may be extracted.

Figure 1A:
FIGS. 1A–1C depict actual fingerprint images from a common donor finger.
Figure 1B:
Figure 1C:

It is to be noted that although the three fingerprint images in FIGS. 1A–1C were all taken from the same donor finger, each of the three images is slightly different, in terms of the orientation of the finger with respect to the platen and also in terms of the distances amongst the features extracted from each image. The set of features (in this case, vertices) in each of the three images can be said to form a "graph". Extraction of the vertices from an image in order to form a graph is now described in the context of graph theory.

A graph can be said to contain a number V of vertices, a number E of "arcs" and a number P of "connected pieces". A simple topological invariant for a graph is the number of connected pieces P; another is the nullity N. Thus, a graph can be globally defined by two fields, P and N, where N=E−V+P. Yet another topological invariant for a graph is the rank, defined as V−P.

The "connected pieces" include portions of the graph where any two vertices are joined by a chain. (A "chain" is a set of one or more distinct arcs which can be ordered thus: a–b, b–c, c–d, . . . , e–f, where vertices in different positions are distinct, i.e., the chain may not intersect itself.) Such a piece is called a non-isolated connected piece. The connected pieces also include so-called "isolated" vertices. An "isolated" vertex is a vertex which is not on any arc. Specifically, an isolated vertex is not connected to another vertex, and is usually an end point from an incoming flux from the edge of the image, or an end point from an outgoing flux to the edge of the image.

In order to select vertices for construction of a graph of isolated vertices and non-isolated connected pieces from a fingerprint image, various techniques may be used, including one which is based on following a set of rules:

Rule 1: Only vertices characterized as a bifurcation or an end point are to be considered (an end point being such only if its complementary valley pattern in white is a bifurcation);

Rule 2: Vertices belonging to any "circuit" are ignored (a "circuit" being defined as a set of one or more distinct arcs which can be put in cyclic order a–b, b–c, . . . , e–f, f-a, where the vertices are distinct as in the case of the chain);

Rule 3: Patterns at boundary regions (namely, top, sides and area next to first joint of the finger) are ignored;

Rule 4: Creases are masked off while continuity of flux flow is maintained;

Rule 5: Pores existing on ridges are used to extend continuity of a flux line;

Rule 6: Where three arcs clearly join to form a bifurcation defined by a ridge and a valley, the point where the ridge meets the valley will be selected;

Rule 7: When end point of an arc appears very close to another arc, select this end point;

Rule 8: No end points are taken from a broken flux.

Figure 3B:
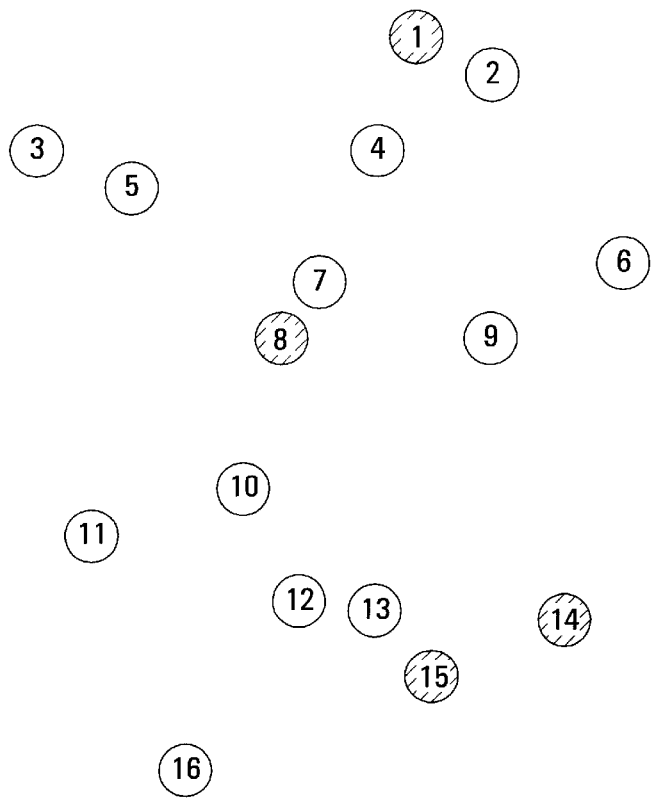
FIG. 3B shows separation of the graph of vertices of FIG. 3A into two sub-graphs, one for isolated vertices and one for non-isolated vertices.
Figure 3B:
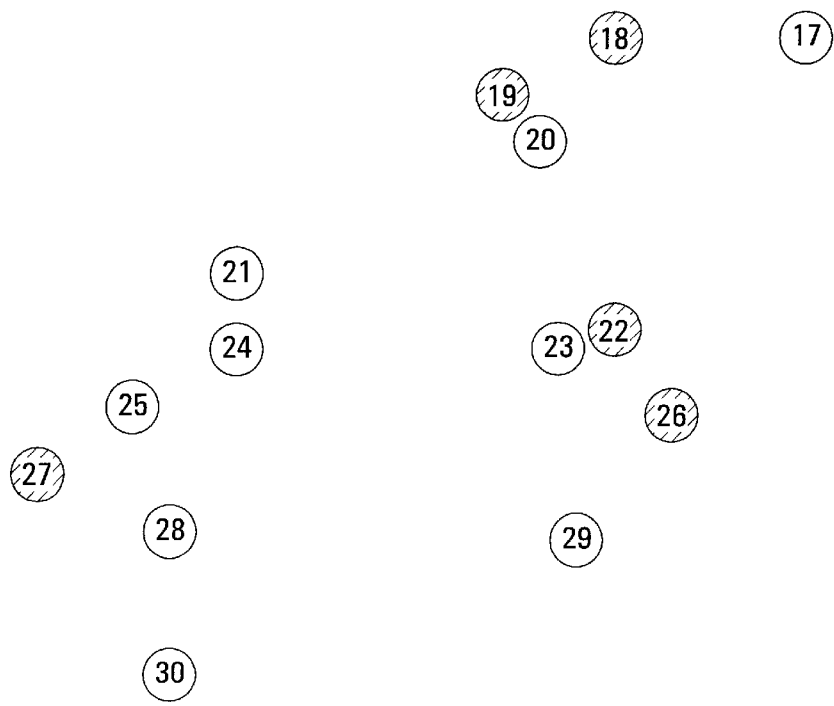

A graph of a fingerprint can thus be divided into two sub-graphs, one of which consists of all the isolated vertices and the other of which consists of all the non-isolated connected pieces. In the following, vertices belonging to non-isolated connected pieces will be referred to as "non-isolated" vertices in the interest of simplicity. Thus, in the case of the image of FIG. 1A, points 1, 8, 14, 15, 18, 19, 22, 26 and 27 are isolated vertices and points 2, 3, 4, 5, 6, 7, 9, 10, 11, 12, 13, 16, 17, 20, 21, 23, 24, 25, 28, 29 and 30 are non-isolated vertices. In FIG. 3B, the isolated vertices have been cross-hatched for easy reference. Since the number of arcs and the number of connected pieces in this graph are 13 and 17, respectively, its nullity is zero. The rank, defined as V−P, is equal to 13.

Continuing with FIG. 2, at step 240, at least one reference point is established as a function of the features (e.g., vertices) extracted at step 220. In one example embodiment, where only a single reference point is used and where the extracted features are indeed vertices, the reference point can be the point, not necessarily a vertex, that minimizes the average distance to all other vertices. The resultant reference point is analogous to a center of mass. In another example embodiment, the reference point can be the point that minimizes the maximum distance between itself and all other vertices.

Figure 4A:
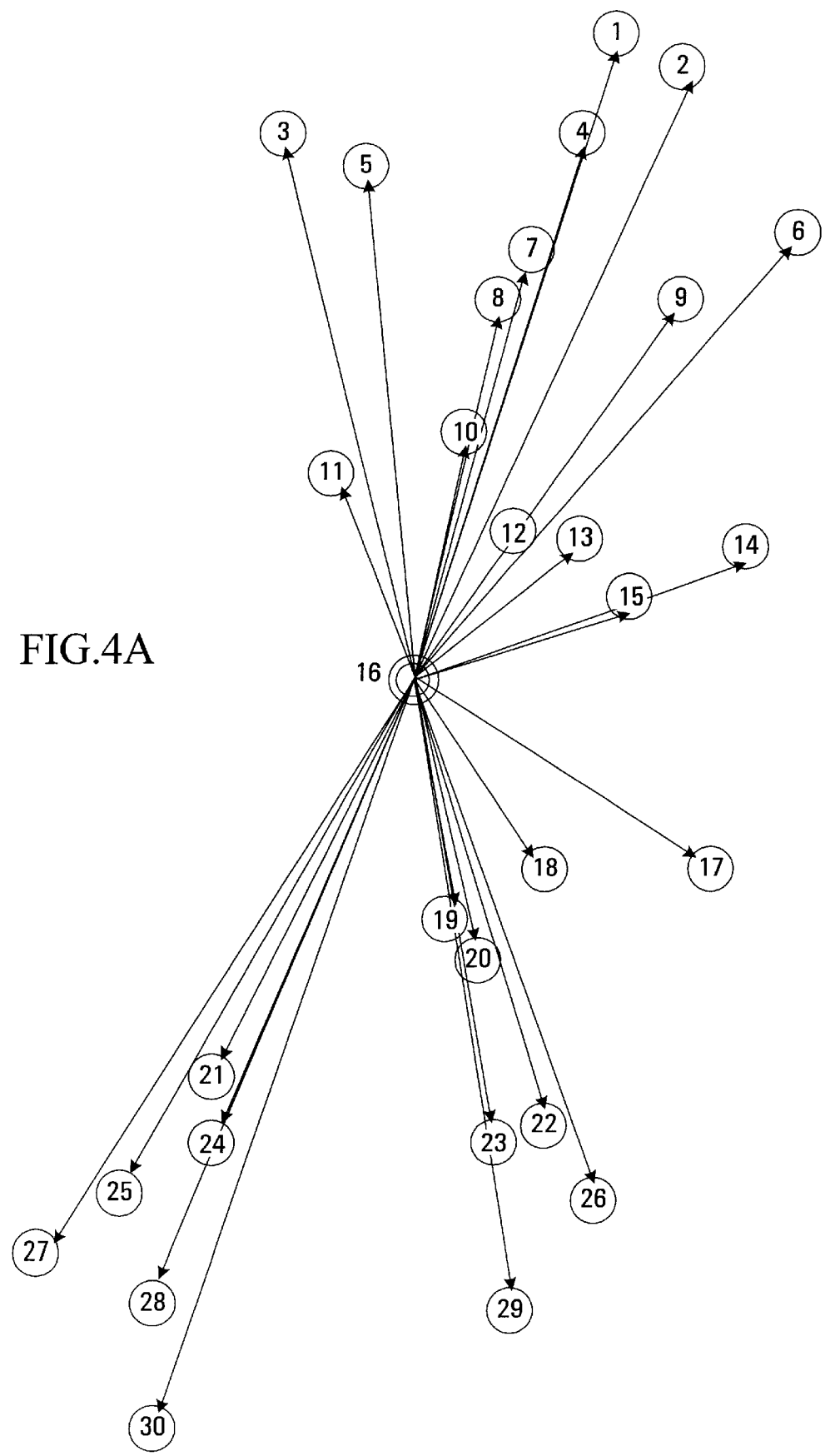
FIG. 4A shows establishment of a reference point based on the graph of vertices of FIG. 3A.

In yet another example embodiment where a single reference point is used, it can be one of the vertices of the graph itself and may be the one vertex for which the average distance to all other vertices is minimized. In still another example embodiment, the reference point can be the one vertex that minimizes the maximum distance between itself and all other vertices. The latter approach was applied to the graph of vertices of FIG. 3A. Specifically, as illustrated in FIG. 4A, the furthest point from reference point 16 is point 30 and it can be shown that no other reference point can yield as small a maximum distance between itself and all other vertices.

It is also within the scope of the present invention to separate the graph of features into multiple sub-graphs based on a separation criterion, and to establish multiple reference points. One reference point may be established for each sub-graph. In one specific embodiment, the features are vertices (each of which, it is recalled, may be characterized as isolated or non-isolated). One sub-graph can thus be made up of the isolated vertices, with the other sub-graph being made up of the non-isolated vertices. In such an embodiment, two reference points can be established, one based on the sub-graph of isolated vertices and the other based on the sub-graph of non-isolated vertices.

By way of example embodiment, the extracted features can be vertices and the reference point for a particular sub-graph can be the point, not necessarily a vertex, that minimizes the average distance to all other vertices on the particular sub-graph. The resultant reference point is analogous to a center of mass. In another example embodiment, the reference point for a particular sub-graph can be chosen so as to minimize the maximum distance between itself and all other vertices on the particular sub-graph.

Figure 4B:
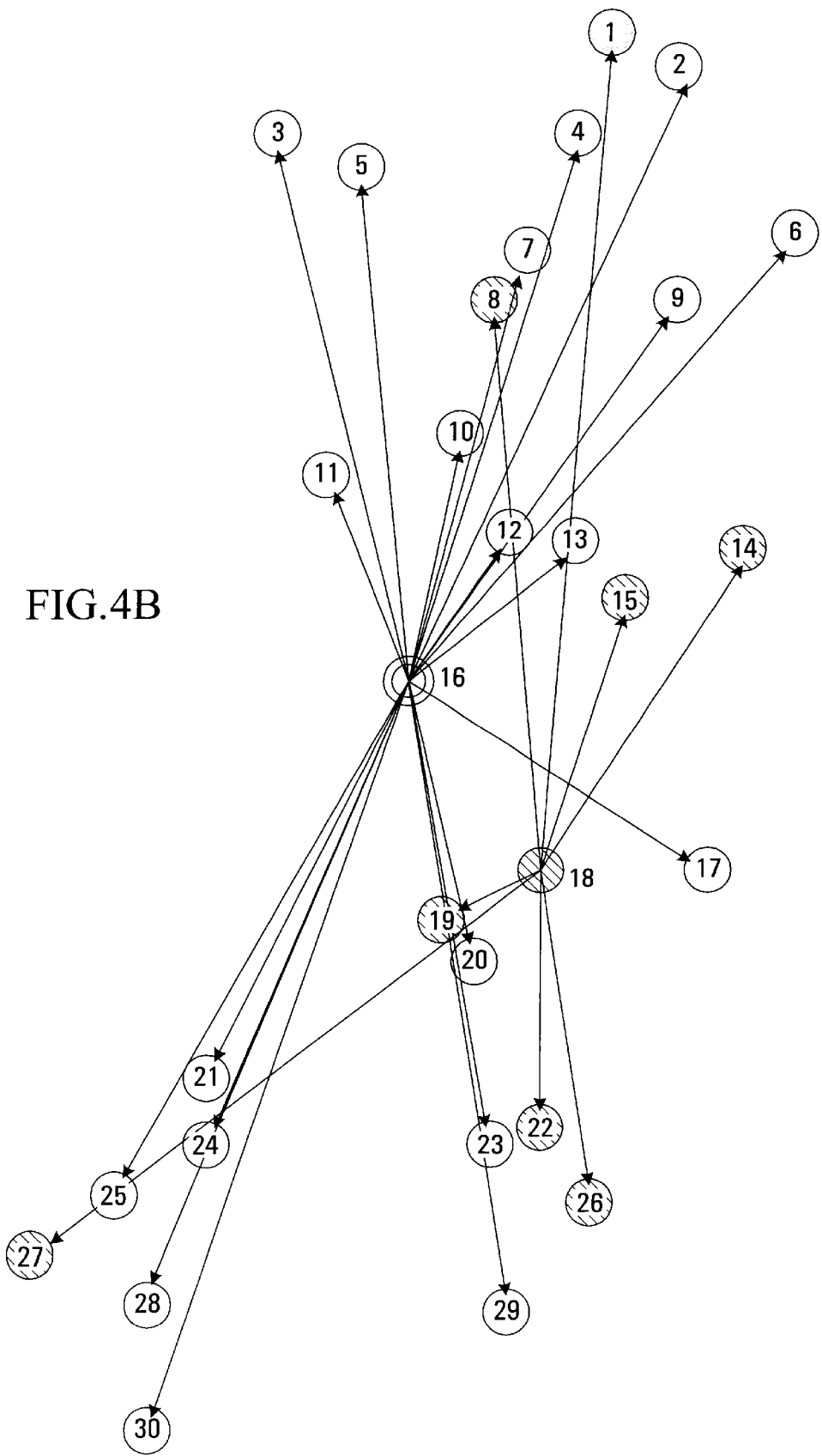
FIG. 4B shows establishment of two reference points based on the two sub-graphs of FIG. 3B.

In another example embodiment, the reference point for a particular sub-graph can be one of the vertices of the sub-graph itself which minimizes the average distance to all other vertices on the particular sub-graph or which minimizes the maximum distance between itself and all other vertices on the sub-graph. By way of specific example, the latter approach was applied to the two sub-graphs of FIG. 3B, where one sub-graph is associated with the isolated vertices (i.e., the cross-hatched points) and another sub-graph is associated with the non-isolated vertices (i.e., the points that have not been cross-hatched). More specifically, as illustrated in FIG. 4B, the furthest non-isolated vertex from reference non-isolated vertex 16 is non-isolated vertex 30 and it can be shown that no other reference non-isolated vertex can yield as small a maximum distance between itself and all other non-isolated vertices. Similarly, the isolated vertex which minimizes the maximum distance between itself and all other isolated vertices is isolated vertex 18.

With continuing reference to FIG. 2, the next step in the code generation process is step 250, which involves the generation of at least one metric based on the reference point or points determined at step 240 and also based on other points in the graph of features.

Accordingly, in one instantiation of step 250, a metric is generated from one reference point and multiple other points in the graph of features (in this case, vertices). This is illustrated in FIG. 5A, where the single metric is taken as the distance between the reference point 16 and the point 8, which is the vertex whose distance to reference point 16 (denoted $d_{avg}$) is closest to the average distance between reference point 16 and all the vertices in the graph. Alternatively, the single metric could have been defined as this average distance itself, without necessarily having to locate the vertex for which the distance to reference point 16 is closest to this average distance.

Figure 5B:
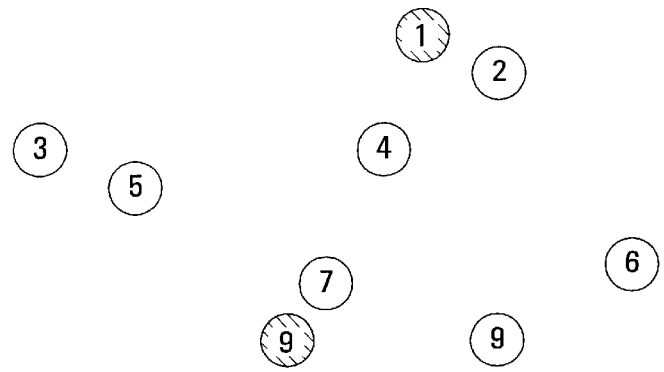
FIG. 5B shows definition of a metric based on the sub-graphs of FIG. 3B and on the reference points established in FIG. 4B.
Figure 5B:
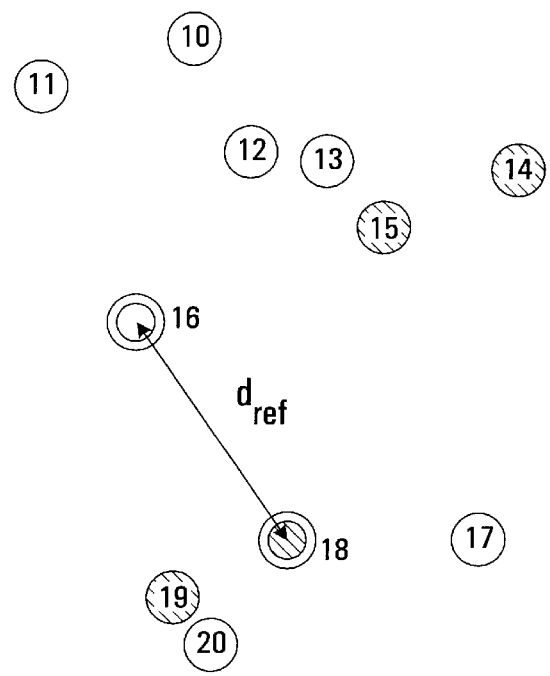
Figure 5B:
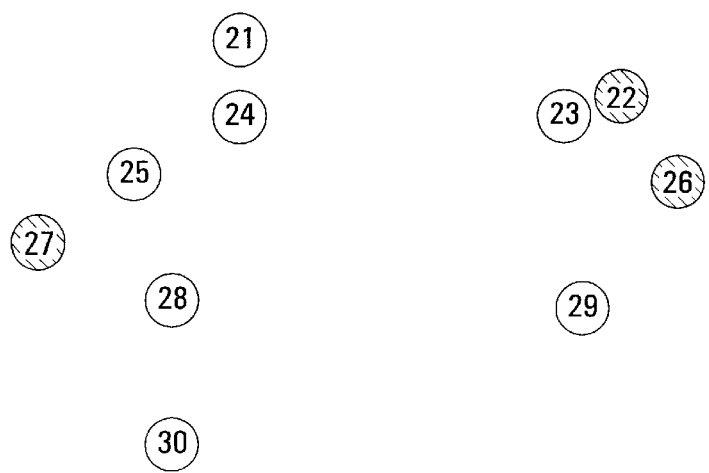

In another instantiation of step 250, a metric is generated from two reference points and, optionally, multiple other points in the graph of vertices. This is illustrated in FIG. 5B, where a single metric based on the two reference points 16 and 18 of FIG. 3B can be taken as the distance (denoted $d_{ref}$) between these two reference points.

Figure 5C:
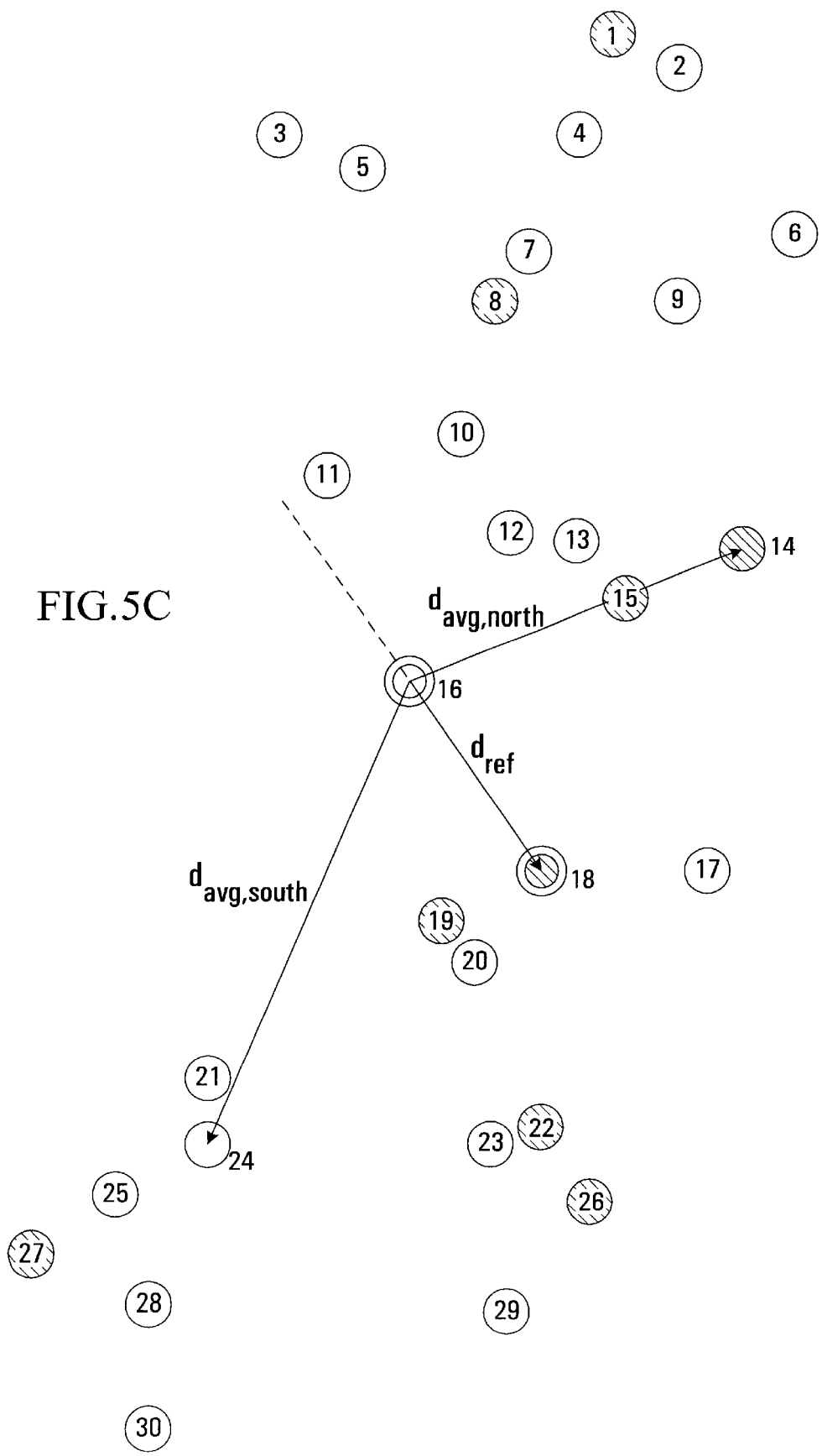
FIG. 5C shows definition of two additional metrics based on the sub-graphs of FIG. 3B and on the reference points established in FIG. 4B.

Although a single metric may sometimes be sufficient to provide both an adequately low probability of false acceptance and an adequately low probability of false rejection, additional improvement in this respect may be obtained through the use of a greater number of metrics. Accordingly, in yet another instantiation of step 250, second and third metrics can be generated from the graph of FIG. 3B. Specifically, as illustrated in FIG. 5C, an axis may be created by extending the line that joins the two reference points (16 and 18). This separates the graph into two sectors, one on either side of the axis. For ease of understanding, the sector to the right and above the axis (in the orientation of FIG. 5C) can be referred to as the "north" sector and the other sector can be referred to as the "south" sector.

A second metric may then be obtained as follows: first, the point which is closest to the average distance between the first reference point 16 and all points (regardless of whether they are isolated or non-isolated vertices) in the north sector is identified. In the case of FIG. 5C, this is point 14. Subsequently, the distance between reference point 16 and point 14 is determined, which yields the second metric (denoted $d_{avg,north}$). Alternatively, the second metric could also have been obtained by first identifying the point which is closest to the average distance between reference point 18 and all points in the north sectors and then measuring the distance between this point and reference point 18.

It should be appreciated that the second metric could also have been obtained by identifying the point which is closest to the average distance between one of the reference points and all points in the north sector and then measuring the distance between that point and the other reference point. Various other alternatives are possible and are within the scope of the present invention. For example, it is not necessary that the distance between the reference point and another point on the graph be measured; the average distance between the reference point and all other points in the north sector of the graph qualifies as a suitable second metric.

A third metric may be obtained in a similar manner, except that it is suitable to consider only those points in the south sector. In this case, point 24 is the vertex for which the distance to reference point 16 is closest to the average distance to reference point 16 from all vertices in the south sector. The measured distance between point 24 and reference point 16 is denoted $d_{avg,south}$.

Of course, many further variations of the above are possible without departing from the spirit of the invention. For example, not all points in each sector need to be considered when evaluating average distances. Hence, although no distinction has been made between isolated and non-isolated vertices when measuring average distances, the making of such a distinction would nonetheless be within the scope of the present invention. In each case, it is noted that the generation of a metric involves consideration of at least one reference point and one or more of the other points in the graph.

Figure 5D:
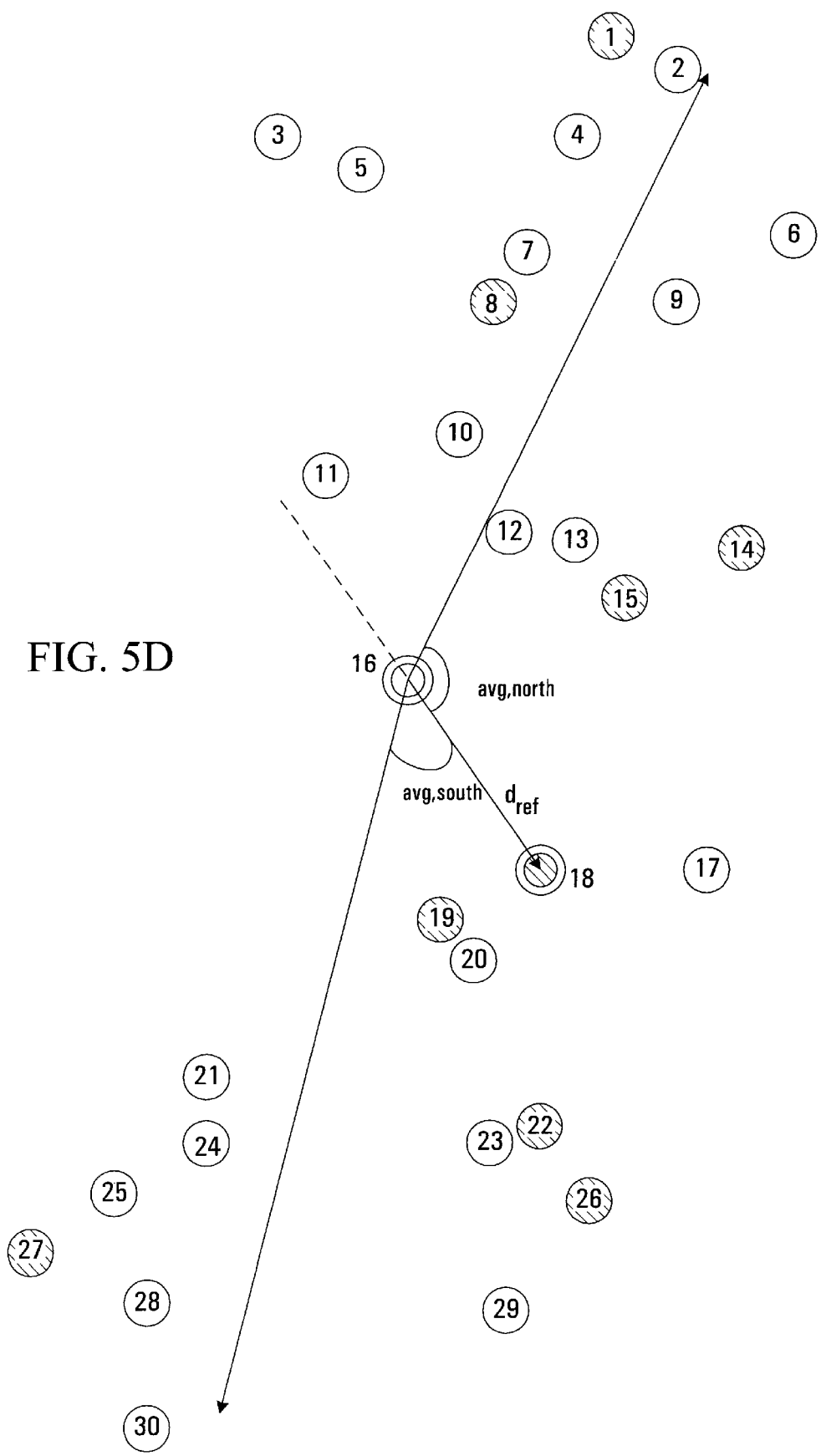
FIG. 5D shows definition of two further additional metrics based on the sub-graphs of FIG. 3B and on the reference points established in FIG. 4B.

By way of example, FIG. 5D shows an alternative way of forming second and third metrics by way of the sectorized approach. Specifically, rather than measure the distance between reference point 16 and a point in each sector, this particular version of step 250 involves measuring angular distance. More specifically, an axis may be created by extending the line joining the two reference points 16 and 18. The angle between this line and the line joining reference point 16 and each point in the north sector is measured; the average angle, denoted $\alpha_{avg,north}$, corresponds to the second metric. Similarly, the angle between the line joining the two reference points 16 and 18 and the line joining reference point 16 and each point in the south sector is measured; the average angle, denoted $\alpha_{avg,south}$, corresponds to the third metric. Of course, reference point 18 could have been used instead of reference point 16 for the purposes of establishing the line to which the angular distance from the line joining the two reference points 16 and 18 is measured.

With continuing reference to FIG. 2, at step 270, quantization is performed on the metric or metrics found at step 250. Since distances and angles are measured in units (such as pixels or millimeters or inches or degrees/minutes/seconds), and since there may be variability in such distances from one fingerprint image to the next, the way to capture donor invariance is through quantization. In fact, it is noted that increasing the number of metrics used reduces the probability of false acceptance, while rendering the quantization granularity coarser improves donor invariance and reduces the probability of false rejection.

Various quantization schemes are within the scope of the present invention. In general, it is within the scope of the present invention to use a scaling factor that brings a measurement to within a desired range. Quantization then consists of applying a many-to-one mapping to the measurement, thereby to create a quantized metric.

For the purposes of illustration, let the range be 2 to 967 (which are the smallest and largest prime numbers between 1 and 1000). Then one may employ a prime-number quantization scheme consisting of the following values: 2, 3, 5, 7, 11, 17, 23, 29, 37, 43, 47, 53, 59, 67, 73, 79, 89, 97, 103, 109, 113, 127, 137, 149, 157, 173, 191, 211, 229, 251, 277, 307, 337, 373, 409, 449, 491, 541, 593, 653, 719, 797, 877, 967. Any value falling between two of the prime numbers in the list can be quantized by the product of these two prime numbers. Any value falling directly on one of the prime numbers in the list can be quantized by the square of that prime number.

The above-described example quantization scheme permits a degree of variability in a measured (unquantized) metric to result in the same metric, once quantized. For instance, a measurement of 26 units would result in the product of 23 and 29, which is equal to 667. In fact, 667 would be the quantized metric corresponding to any measurement between 23 and 29, exclusively. However, any measured metric outside this range would yield a different quantized metric. This permits the measured metric to suffer a variability of approximately 20–26 percent without resulting in distortion. For values between 653 and 719, the allowed variability is between 9–10 percent. Of course, the values used in this example quantization scheme are by way of illustration only and should not be interpreted as limiting the scope of the present invention.

With more rigid control of the gaps between the various possible quantized levels, the allowed variability can be maintained to within a desired range. One possible design of the quantization scheme maintains an almost equal allowable variability range, but does not use prime numbers. In such a case, it is not useful to form a product of the two end values, since it is not possible to tell what the factors of the product were, based only on the product itself. In such a case, it is within the scope of the present invention to encode the end values. This can be done through the use of bit positions, for example. Thus, if the dynamic range of the measured metric is 16 bits, then two bits could be used to quantize each measured metric, where one bit represents the next highest quantization level and another bit represents the next lowest quantization level. Alternatively, it is within the scope of the invention to use a single bit or bit position to represent the next highest or next lowest quantization level. Thus, the quantized metric can in fact represent an exponent.

Regardless of the quantization scheme used, the result of the quantization step is a loss of information in the sense that precision of the measured metric is reduced. This leads to a quantized metric that will be the same even if there are small variations in the measured metric. If more than one measured metric is to be quantized, the same quantization scheme can be used for each required quantization operation, or a different quantization scheme can be used depending on the quantity that was measured (e.g., distance, angle, etc.) It is noted that once quantized, a metric can take on a computer readable form that need not be numerical.

Finally, at step 280, the quantized metric or metrics are combined in order to form a code. This may be achieved by simply concatenating the various metrics in order to form a digital string that can be stored in computer memory or transmitted along a transmission medium. In the case where each quantized metric is the product of two prime numbers between 2 and 967, the total number of bits required to store such a quantized metric is equal to 20. Therefore, 60 bits would be required to store a code that is the concatenation of three 20-bit quantized metrics.

Additional information may be appended to the code or used to encrypt the code. For example, topological properties of the graph of vertices may be used for this purpose. Specifically, a graph that contains isolated and non-isolated vertices has a "rank" and a "nullity", which have been previously defined. For the same donor finger, these properties do not vary from one fingerprint image to the next, as long as the image quality remains sufficiently high. Hence, the rank and/or nullity may be appended to the quantized metric or metrics obtained at step 270 in order to form a longer code. Alternatively, the rank and/or nullity may be used as keys in order to encrypt the metric or metrics in order to generate a more secure code than in the absence of encryption.

When initially generating the code corresponding to a fingerprint image with the aim of using the generated code as a template, steps 220–270 may be performed several times in order to determine whether quantization of a particular metric always yields the same result, i.e., whether the quantized metric is donor-invariant. If this is not the case, then it may be concluded that one or more of the fingerprint images is distorted or that the finger has suffered an environmental anomaly. Thus, a voting system may be instituted in order to decide on the quantized metric to use as part of the donor-invariant code.

Figure 6:
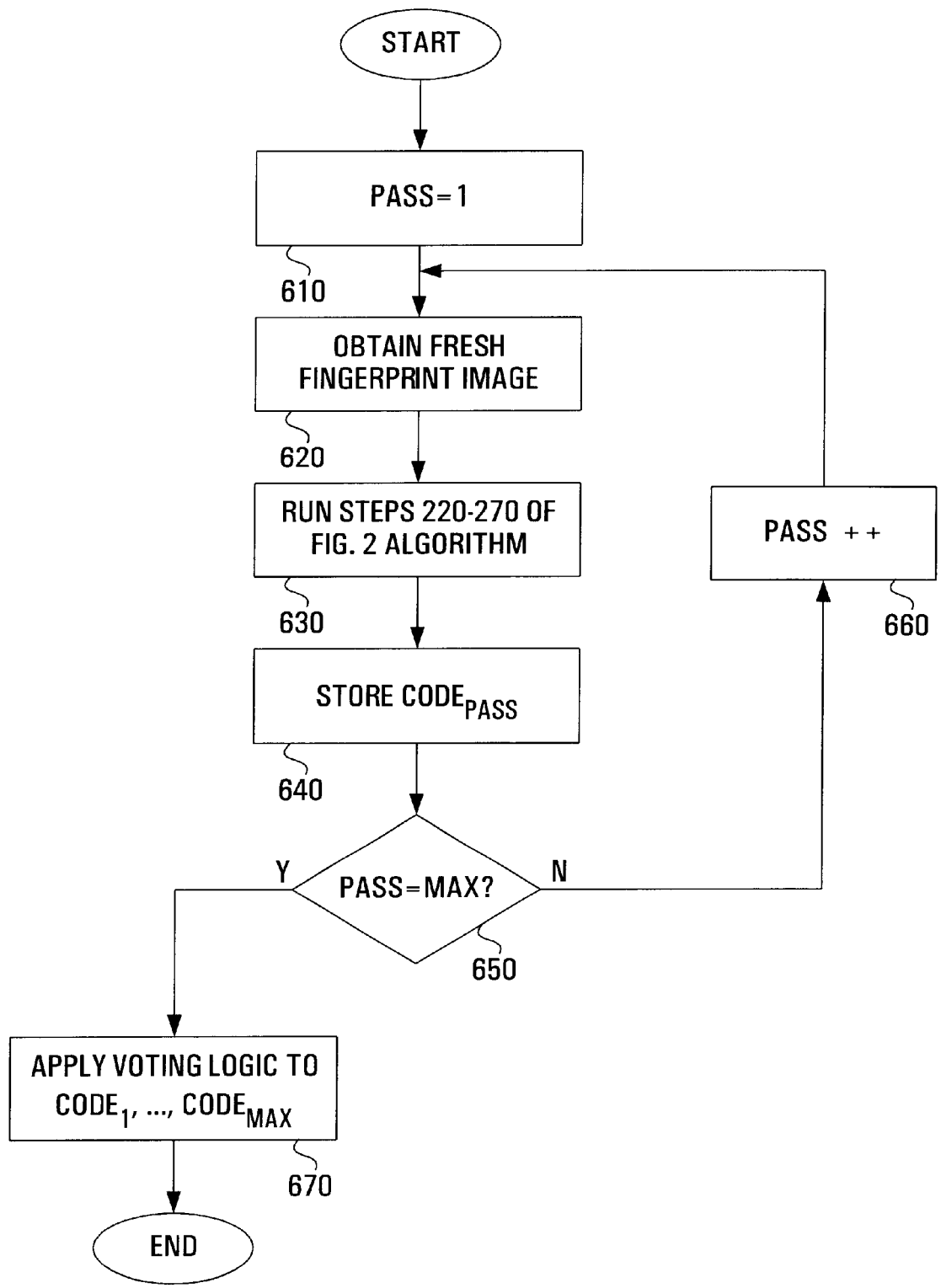
FIG. 6 shows a system for generating a database of fingerprint codes, in accordance with an embodiment of the present invention.

To this end, it is within the scope of the invention to provide a "fingerprint database generator" which follows the steps in an algorithm now described with reference to FIG. 6. The fingerprint database generator is assumed to include a memory, a processor and a communications link to a remote testing station. At step 610, a variable (denoted "pass") is initialized to 1. This indicates that this is the first pass through the algorithm. This step may also include gathering personal information about an individual for which a code is about to be generated, such as a name or employee identification number. At step 620, the fingerprint database generator obtains a fingerprint image from the remote testing station in any suitable manner. At step 630, the fingerprint database generator runs steps 220–270 of the algorithm previously described in FIG. 2 on the fingerprint image and obtains a preliminary set of quantized metrics therefrom. At step 640, the quantized metrics are stored in a local memory.

At step 650, it is verified whether the current pass through the algorithm is the $\max^{th}$ pass and, if not, the algorithm increments the value of pass at step 660 and returns to step 620 where a next fingerprint image is taken, and so on. However, if step 650 reveals that this is already the $\max^{th}$ pass through the algorithm, the fingerprint database generator exits the algorithm at step 670, where voting logic selects the actual quantized metrics to be used in generation of the code associated with the donor finger. Since it is unlikely and also undesirable that all passes yield different results for the quantized metrics (when the same finger is used), the voting logic can select the most often occurring quantized metric in each case. At step 680, the code resulting from the selected metrics is then associated with the name or employee identification number (which was collected at step 610) and is stored as part of a database in the memory.

Figure 7A:
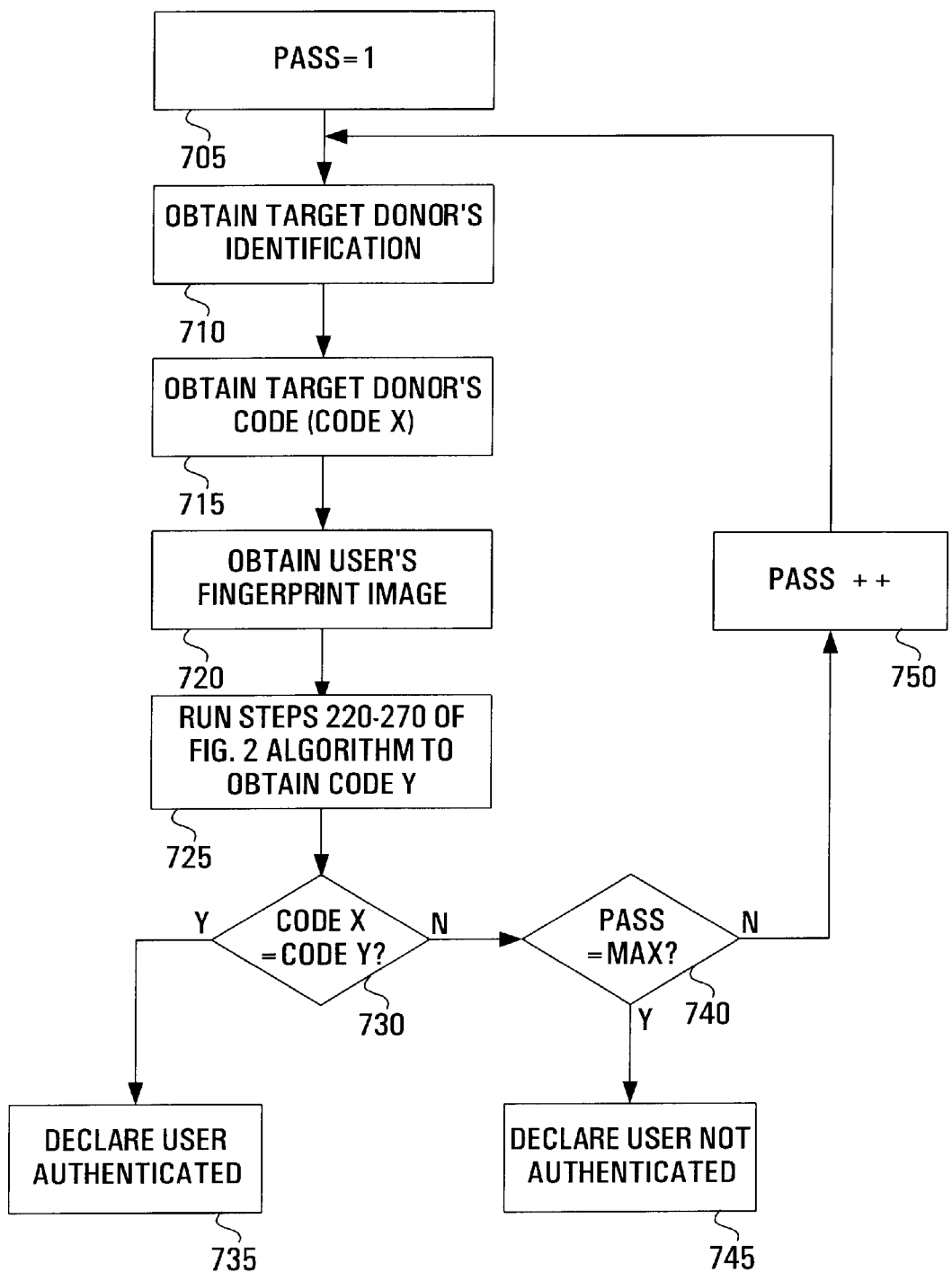
FIG. 7A shows a fingerprint authentication system in accordance with an embodiment of the present invention.

Once a database is created for one or more donors, it is possible to devise a system for authenticating individuals. Now described with reference to FIG. 7A is a "donor authentication system" which relies on the algorithm of FIG. 2 in order to authenticate a user claiming to be a particular target donor. At step 705, a variable (denoted "pass") is set to 1, indicating that this is the first pass through the algorithm. At step 710, the user presenting a finger provides identification information. This may be the name or employee identification number of a target donor. The identification information is used by the authentication system as an index into a database of codes (e.g., such as may be generated using the algorithm of FIG. 6), from which the code corresponding to the target donor is extracted at step 715. It then becomes of interest to determine whether the user's finger will produce the same code as that which was extracted from the database (and which corresponds to the target donor).

Accordingly, at step 720, a fingerprint image is obtained from the user's finger by way of a remote testing station. Having obtained a fingerprint image from the user, the authentication system then runs the algorithm of FIG. 2 on the image at step 725 in order to produce a code. At step 730, the generated code is compared to the one extracted at step 715 in order to determine whether there is a match. If there is a match, then the authentication system declares at step 735 that the individual who gave the finger for testing at step 720 is indeed the target donor. The user has therefore been successfully authenticated, i.e., the user is deemed to be who he or she claims to be.

However, if the comparison at step 730 reveals that the generated and extracted codes do not match, then either there has been an error in taking the image or the person who provided their finger is not who he or she claims to be (i.e., the user is an impostor of the target donor). Hence, the next step is to check, at step 740, how many times such a failure has occurred. If the variable "pass" is equal to max (which can be, say, 3 or 4), then such repeated failure may be indicative of attempted fraud and consequently an alarm may be raised at step 745. However, if "pass" is equal to less than max, then the user presenting a finger may be allowed to reinitiate the process of providing a new fingerprint image (at step 720), which can optionally be preceded by reentry of personal information (at step 710). In either case, the value of "pass" would be incremented at step 750.

The fact that the donor authentication system allows a user to supply a finger several times reduces the likelihood of false rejection in case the user is indeed the target donor (whose code is stored in the database), but whose fingerprint has undergone a rare abhorrence. At the same time, however, this occurs without a corresponding increase in the likelihood of false acceptance, since it is highly unlikely that any finger other then the target donor's finger will produce the target donor's code after any number of attempts, due to the uniqueness of the features being used in the generation of the code.

Applicant has also appreciated that it is within the scope of the present invention for the donor authentication system to ask a user claiming to be a particular target donor to provide his or her finger more than once, regardless of whether a code match is found at step 730. It may be beneficial to do so in order to detect the specific case where the user is attempting to fool the system by providing, say, a photograph or a mold of a fingerprint image previously taken from the target donor's finger. Since it is extremely unlikely that two subsequent images of the same finger lead to exactly the same raw (pre-quantization) data, fraudulent activity can be detected if the same "copy" is presented for a second or subsequent fingerprint image.

Figure 7B:
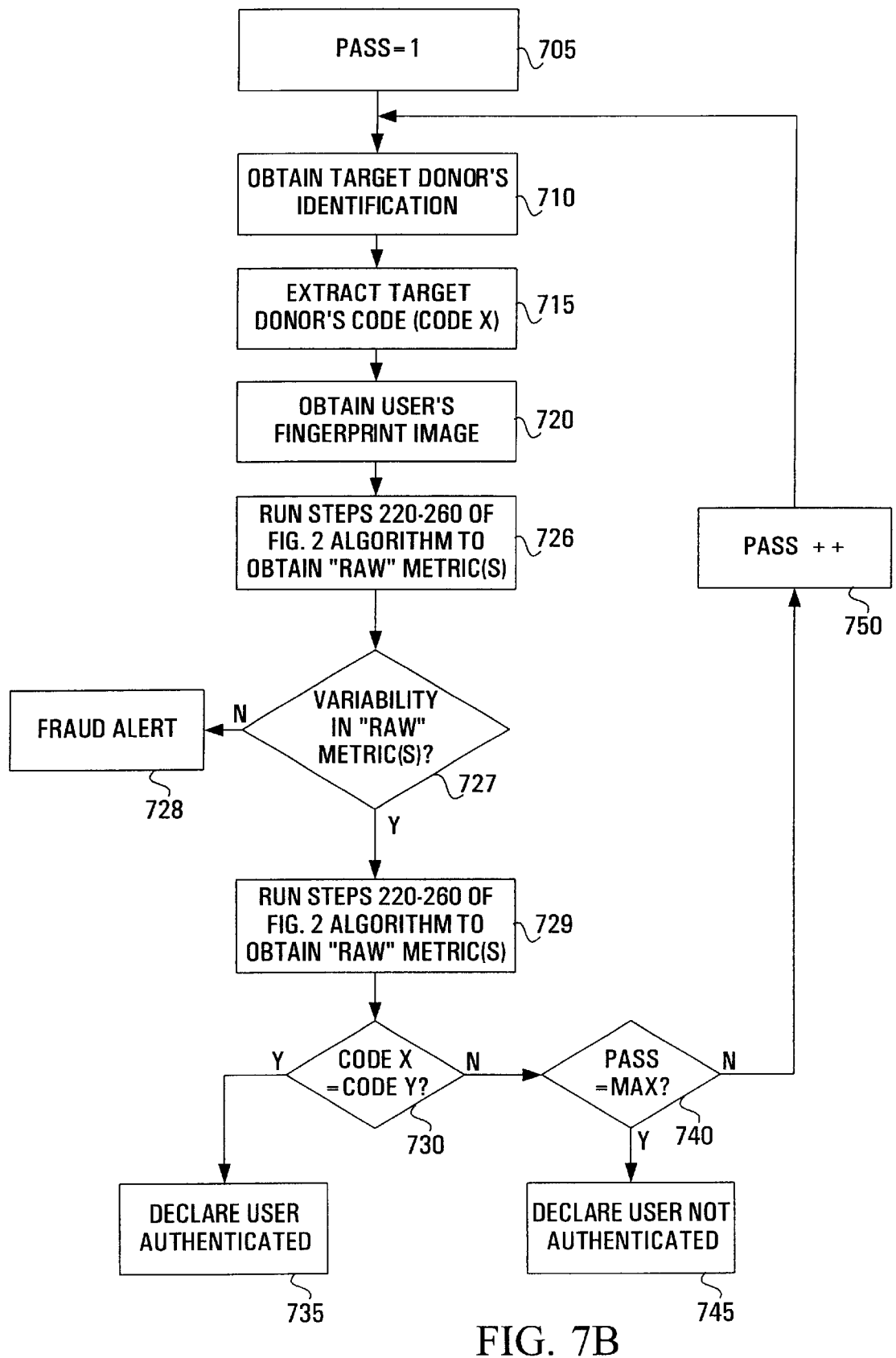
FIG. 7B shows a fingerprint authentication system in accordance with an embodiment of the present invention.

In order to implement this functionality, now described with reference to FIG. 7B, a code match found at step 730 leads to step 860, where the value of the variable "pass" is compared against a maximum value. If this is the last pass through the algorithm, then the system can declare with some certainty at step 735 that the user has been successfully authenticated. However, if this is not the last pass through the algorithm, then the value of pass is incremented at step 750 and the system will require further analysis of the "raw" metrics at steps 820–850 (prior to quantization).

More specifically, after step 720, the donor authentication system performs step 810, which consists of steps 220, 240 and 250 of FIG. 2. The result will be the generation of a set of not yet quantized metrics, hereinafter referred to as "unquantized" metrics. At step 820, the unquantized metrics are stored in a local memory. At step 830, which follows step 820, it is verified whether the variable "pass" is greater than 1 (i.e., whether this is a second or subsequent pass through the present algorithm). During a first pass, the answer will of course be no, and the algorithm proceeds with step 860, consisting of step 270 of the algorithm in FIG. 2.

However, if it is determined at step 830 that the value of "pass" is greater than 1, then this means that step 820 will have been executed at least twice, which implies that there are at least two sets of unquantized metrics stored in the local memory. Thus, if the value of "pass" is greater than 1, the next step to be executed is step 840. Step 840 consists of measuring differences in each individual unquantized metric, from one set of metrics to another. The motivation for this step is as follows: although it is likely that consecutive live-scan fingerprint images will yield identical quantized metrics, it is extremely unlikely that the metrics will have been the same prior to quantization. This is because there are expected to always be slight variations in pressure, orientation, humidity, etc., between consecutive applications of a finger to a platen.

Therefore, if no variations are detected, then it may be concluded that there is fraudulent activity and an alert to this effect may be signalled at step 850. Otherwise, the algorithm proceeds to step 860, which is effectively the quantization step from the algorithm in FIG. 2.

Those skilled in the art should appreciate that in some embodiments of the invention, all or part of the functionality previously described herein with respect to fingerprint encoding, fingerprint database generation and/or donor authentication may be implemented as pre-programmed hardware or firmware elements (e.g., application specific integrated circuits (ASICs), electrically erasable programmable read-only memories (EEPROMs), etc.), or other related components.

In other embodiments of the invention, all or part of the functionality previously described herein with respect to fingerprint encoding, fingerprint database generation and/or donor authentication may be implemented as software consisting of a series of program instructions for execution by a digital computer, including a processing unit and a memory connected by a communication bus. Such memory includes data and the program instructions. The processing unit is adapted to process the data and the program instructions in order to implement the functional blocks described in the specification and for which the operation is depicted in the drawings.

The program instructions could be stored on a medium which is fixed, tangible and readable directly by the computer system, (e.g., removable diskette, CD-ROM, ROM, or fixed disk), or the program instructions could be stored remotely but transmittable to the computer system via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should further appreciate that the program instructions may be written in a number of programming languages for use with many computer architectures or operating systems. For example, some embodiments may be implemented in a procedural programming language (e.g., "C") or an object oriented programming language (e.g., "C++" or "JAVA").

While specific embodiments of the present invention have been described and illustrated, it will be apparent to those skilled in the art that numerous modifications and variations can be made without departing from the scope of the invention as defined in the appended claims.

I claim:

1. A method of generating an identification code from a fingerprint image exhibiting a plurality of features, comprising: establishing a reference point from the plurality of features; wherein establishing a reference point comprises determining which one feature from a subset of the plurality of features minimizes the maximum distance between itself and all others of the plurality of features from said subset of the features, said reference point being said one feature; generating at least one metric from the reference point and at least one of the plurality of features; and forming the identification code from the at least one metric.

2. A method as defined in claim 1, wherein establishing a reference point comprises determining the location of a point on the fingerprint image that is central to the plurality of features.

3. A method as defined in claim 1, wherein establishing a reference point comprises determining the location of a point on the fingerprint image that is central to a subset of the plurality of features.

4. A method as defined in claim 3, wherein said subset of the plurality of features consists of isolated vertices, wherein a vertex is isolated if it is not connected to another vertex.

5. A method as defined in claim 3, wherein said subset of the plurality of features consists of non-isolated vertices, wherein a vertex is non-isolated if it is connected to another vertex.

6. A method as defined in claim 3, wherein establishing a reference point comprises determining which one of the isolated vertices minimizes the maximum distance between itself and all other isolated vertices, said reference point being said one of the isolated vertices.

7. A method as defined in claim 3, wherein establishing a reference point comprises determining which one of the non-isolated vertices minimizes the maximum distance between itself and all other non-isolated vertices, said reference point being said one of the non-isolated vertices.

8. A method as defined in claim 3, wherein the reference point is a first reference point and wherein said subset of the features is a first subset, the method further comprising: establishing a second reference point by determining the location of a point on the fingerprint image that is central to a second subset of the plurality of features; wherein generating at least one metric includes determining a distance between the first reference point and the second reference point, said metric being said distance.

9. A method as defined in claim 8, wherein the first subset of the plurality of features consists of isolated vertices and wherein the second subset of the plurality of features consists of non-isolated vertices.

10. A method as defined in claim 1, wherein establishing a reference point comprises determining which one of the plurality of features minimizes the maximum distance between itself and all others of the plurality of features, said reference point being said one of the features.

11. A method as defined in claim 1, wherein the reference point is a first reference point, wherein said subset is a first subset, wherein said one feature is a first feature, the method further comprising: establishing a second reference point by determining which second feature from a second subset of the plurality of features minimizes the maximum distance between itself and all other features from said second subset of the features, said reference point being said second feature; wherein generating at least one metric includes determining a distance between the first reference point and the second reference point, said at least one metric including said distance.

12. A method as defined in claim 11, wherein the first subset of the plurality of features consists of isolated vertices and wherein the second subset of the plurality of features consists of non-isolated vertices.

13. A method as defined in claim 11, wherein generating at least one metric includes: generating a plurality of metrics by determining an average distance between the first reference point and a respective subset of the features, wherein each said subset of the features includes those features in an angular sector measured with respect to an imaginary line that joins the first and second reference points, said at least one metric including said average distance.

14. A method as defined in claim 11, wherein generating at least one metric includes determining an average angle between an imaginary line joining the first and second reference points and each of the plurality of features.

15. A method as defined in claim 1, wherein the reference point is a first reference point, the method further comprising: establishing a second reference point; wherein generating at least one metric includes determining a distance between the first reference point and the second reference point, said metric being said distance.

16. A method as defined in claim 1, wherein generating at least one metric includes determining an average distance between the reference point and each of the plurality of features.

17. A method as defined in claim 1, wherein generating at least one metric includes:determining an average distance between the reference point and each of the plurality of features; determining one feature for which the distance between the reference point and said one feature is closest to the average distance; and determining a distance between the reference point and said one feature.

18. A method as defined in claim 1, wherein generating at least one metric includes determining an average distance between the reference point and each feature in a subset of the plurality of features.

19. A method as defined in claim 1, wherein generating at least one metric includes: determining an average distance between the reference point and each feature in a subset of the plurality of features; determining one feature in said subset of the plurality of features for which the distance between the reference point and said one feature is closest to the average distance; and determining a distance between the reference point and said one feature.

20. A method as defined in claim 19, wherein said subset of the plurality of features includes a set of isolated vertices, wherein a vertex is isolated if it is not connected to another vertex.

21. A method as defined in claim 19, wherein said subset of the plurality of features includes a set of non-isolated vertices.

22. A method as defined in claim 1, wherein forming the identification code from the at least one metric includes: scaling each metric to within a desired range; applying a many-to-one mapping to each scaled metric, thereby to create at least one respective quantized metric; and combining the at least one quantized metric to form the identification code.

23. A method as defined in claim 22, wherein said many-to-one mapping maps onto a set of prime numbers.

24. A method as defined in claim 22, wherein said many-to-one mapping maps onto products of pairs of prime numbers.

25. A method as defined in claim 22, wherein said many-to-one mapping maps onto powers of two.

26. A method as defined in claim 22, wherein combining the at least one quantized metric to form the identification code includes concatenating the at least one quantized metric with at least one topologically invariant parameter, thereby to generate the identification code.

27. A method as defined in claim 26, wherein the at least one topologically invariant parameter includes a nullity of a graph defined by the plurality of features.

28. A method as defined in claim 27, wherein the at least one topologically invariant parameter further includes a number of connected pieces of a graph defined by the plurality of features.

29. A method as defined in claim 26, wherein the at least one topologically invariant parameter includes a number of connected pieces of a graph defined by the plurality of features.

30. Computer-readable media tangibly embodying a program of instructions executable by a computer to perform the method of claim 1.

31. A system for generating an identification code from a fingerprint image exhibiting a plurality of features, comprising: means for establishing a reference point from the plurality of features; wherein establishing a reference point comprises determining which one feature from a subset of the plurality of features minimizes the maximum distance between itself and all others of the plurality of features from said subset of the features, said reference point being said one feature; means for generating at least one metric from the plurality of features and the reference point; and means for forming the identification code from the at least one metric.

32. A computer readable storage medium containing a program element for execution by a computing device to implement a system for generating an identification code from a fingerprint image exhibiting a plurality of features, said program element including: program code for establishing a reference point from the plurality of features; wherein establishing a reference point comprises determining which one feature from a subset of the plurality of features minimizes the maximum distance between itself and all others of the plurality of features from said subset of the features, said reference point being said one feature; program code for generating at least one metric from the plurality of features and the reference point; and program code for forming the identification code from the at least one metric.

33. A method of generating an identification code for association with a human finger, comprising: obtaining a fingerprint image of the finger; identifying a plurality of features on the fingerprint image; establishing a reference point from the plurality of features; wherein establishing a reference point comprises determining which one feature from a subset of the plurality of features minimizes the maximum distance between itself and all others of the plurality of features from said subset of the features, said reference point being said one feature; generating at least one metric from the reference point and at least one of the plurality of features; and forming the identification code from the at least one metric.

34. A method as defined in claim 33, wherein identifying a plurality of features on the fingerprint image comprises identifying a set of isolated vertices and a set of non-isolated vertices, wherein a vertex is isolated if it is not connected to another vertex and wherein a vertex is non-isolated if it is connected to another vertex.

35. A method as defined in claim 33, wherein identifying a plurality of features on the fingerprint image includes: identifying all bifurcations, end points, vertices, pores, arcs, circuits, flux lines and creases; marking off creases while maintaining continuity of a flux line; using pores existing on ridges to extend continuity of a flux line; where three arcs join to form a bifurcation defining a ridge and a valley, selecting the point where the ridge meets the valley as one of the plurality of features; where an end point of an arc appears very close to another arc, selecting this end point as one of the plurality of features; and ignoring vertices belonging to any circuit and end points taken from a broken flux.

36. A method of generating an identification code for association with a human finger, comprising: obtaining a plurality of fingerprint images of the finger; identifying, for each fingerprint image, a respective plurality of features; establishing, from each plurality of features, a respective reference point; wherein establishing a reference point comprises determining which one feature from a subset of the plurality of features minimizes the maximum distance between itself and all others of the plurality of features from said subset of the features, said reference point being said one feature; generating, from each plurality of features and the respective reference point, a respective metric; identifying a most frequently occurring metric from amongst the generated metrics; and forming the identification code as a function of the most frequently occurring metric.

37. A system for generating an identification code for association with a human finger, comprising: means for obtaining a fingerprint image of the finger; means for identifying a plurality of features on the fingerprint image; means for establishing a reference point from the plurality of features; wherein establishing a reference point comprises determining which one feature from a subset of the plurality of features minimizes the maximum distance between itself and all others of the plurality of features from said subset of the features, said reference point being said one feature; means for generating at least one metric from the reference point and at least one of the plurality of features; and means for forming the identification code from the at least one metric.

38. A computer readable storage medium containing a program element for execution by a computing device to implement a system for generating an identification code for association with a human finger, the program element including: program code means for obtaining a fingerprint image of the finger; program code means identifying a plurality of features on the fingerprint image; program code means establishing a reference point from the plurality of features; wherein establishing a reference point comprises determining which one feature from a subset of the plurality of features minimizes the maximum distance between itself and all others of the plurality of features from said subset of the features, said reference point being said one feature; program code means generating at least one metric from the reference point and at least one of the plurality of features; and program code means forming the identification code from the at least one metric.

39. A computer readable medium storing a program for execution by a computing device to generate an identification code for association with a human finger, the program including the steps of: a step of generating at least one quantized metric generated as a function of (i) at least one of a plurality of features and (ii) a reference point established from the plurality of features; wherein establishing a reference point comprises determining which one feature from a subset of the plurality of features minimizes the maximum distance between itself and all others of the plurality of features from said subset of the features, said reference point being said one feature.

40. A fingerprint-based user authentication system, comprising: a database of identification codes uniquely associated with respective users; an input device for obtaining, from a test user, a first fingerprint image and information identifying a first user; and a controller connected to the input device and to the database, the controller being operable to: (a) access the database in order to obtain a first identification code associated with the first user; (b) process the first fingerprint image in order to generate a second identification code; wherein processing the first fingerprint image in order to generate a second identification code includes: identifying a plurality of features on the first fingerprint image; establishing a reference point from the plurality of features; wherein establishing a reference point comprises determining which one feature from a subset of the plurality of features minimizes the maximum distance between itself and all others of the plurality of features from said subset of the features, said reference point being said one feature; generating at least one metric as a function of the reference point and at least one of the plurality of features; and forming the second identification code from the at least one metric; and (c) authenticate the test user as the first user by comparing the first and second identification codes to one another.

41. A system as defined in claim 40, wherein authenticating the test user as the first user by comparing the first and second identification codes to one another includes: if the first and second identification codes are identical, instructing the input device to obtain, from the test user, a second version of the first fingerprint image.

42. A system as defined in claim 41, wherein authenticating the test user as the first user by comparing the first and second identification codes to one another further includes: determining whether any variations in at least one metric exist amongst two or more versions of the first fingerprint image; and if no variations exist, concluding that the test user is not the first user.

43. A system as defined in claim 41, wherein authenticating the test user as the first user by comparing the first and second identification codes to one another includes: concluding that the test user is the first user if the first and second identification codes are identical.

44. A system as defined in claim 41, wherein authenticating the test user as the first user by comparing the first and second identification codes to one another includes: concluding that the test user is not the first user if the first and second identification codes are not identical.

* * * * *